(No Model.) 2 Sheets—Sheet 1.

O. R. CHASE.
MACHINE FOR MOLDING OR SHAPING CONFECTIONERY AND OTHER PLASTIC MATERIALS.

No. 279,131. Patented June 12, 1883.

Witnesses:
W. H. Chapman
Walter E. Lombard

Inventor:
Oliver R. Chase
by N. C. Lombard
Attorney.

(No Model.) 2 Sheets—Sheet 2.
O. R. CHASE.
MACHINE FOR MOLDING OR SHAPING CONFECTIONERY AND OTHER PLASTIC MATERIALS.
No. 279,131. Patented June 12, 1883.
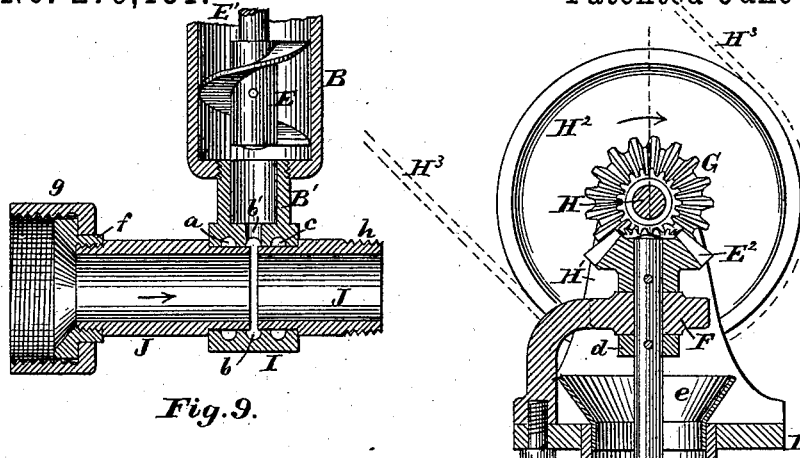
Fig. 9.
Fig. 3.
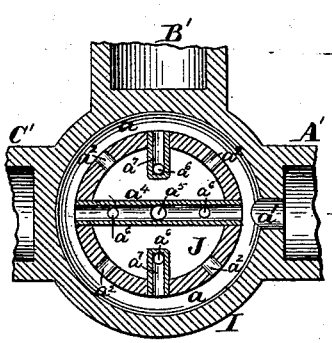
Fig. 5.
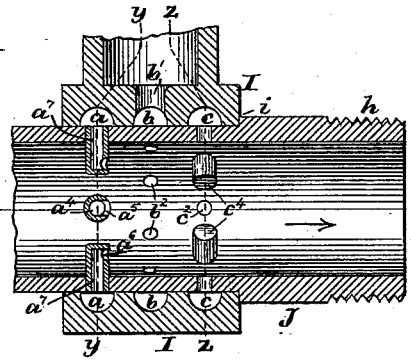
Fig. 4.
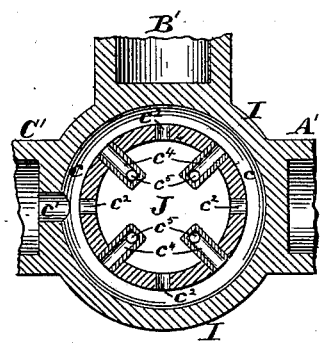
Fig. 6.
Witnesses:
W. H. Chapman
Walter E. Lombard.
Inventor:
Oliver R. Chase
by N. C. Lombard,
Attorney.

UNITED STATES PATENT OFFICE.

OLIVER R. CHASE, OF BOSTON, MASSACHUSETTS.

MACHINE FOR MOLDING OR SHAPING CONFECTIONERY AND OTHER PLASTIC MATERIALS.

SPECIFICATION forming part of Letters Patent No. 279,131, dated June 12, 1883.

Application filed January 20, 1883. (No model.)

*To all whom it may concern:*

Be it known that I, OLIVER R. CHASE, of Boston, in the county of Suffolk and State of Massachusetts, have invented certain new and useful Improvements in Machines for Molding or Shaping Confectionery and other Plastic Materials, of which the following, taken in connection with the accompanying drawings, is a specification.

My invention is especially adapted for use in the manufacture of confectionery, and is designed for decorating or ornamenting rods or sticks of confectionery while they are being formed from sugar-paste; and it consists of certain arrangements and construction of mechanism by which lines or stripes of paste of various colors may be placed upon the exterior or interior of said stick or column of sugar-paste, all of which will be best understood by reference to the description of the drawings, and the claims to be hereinafter given.

Figure 1:
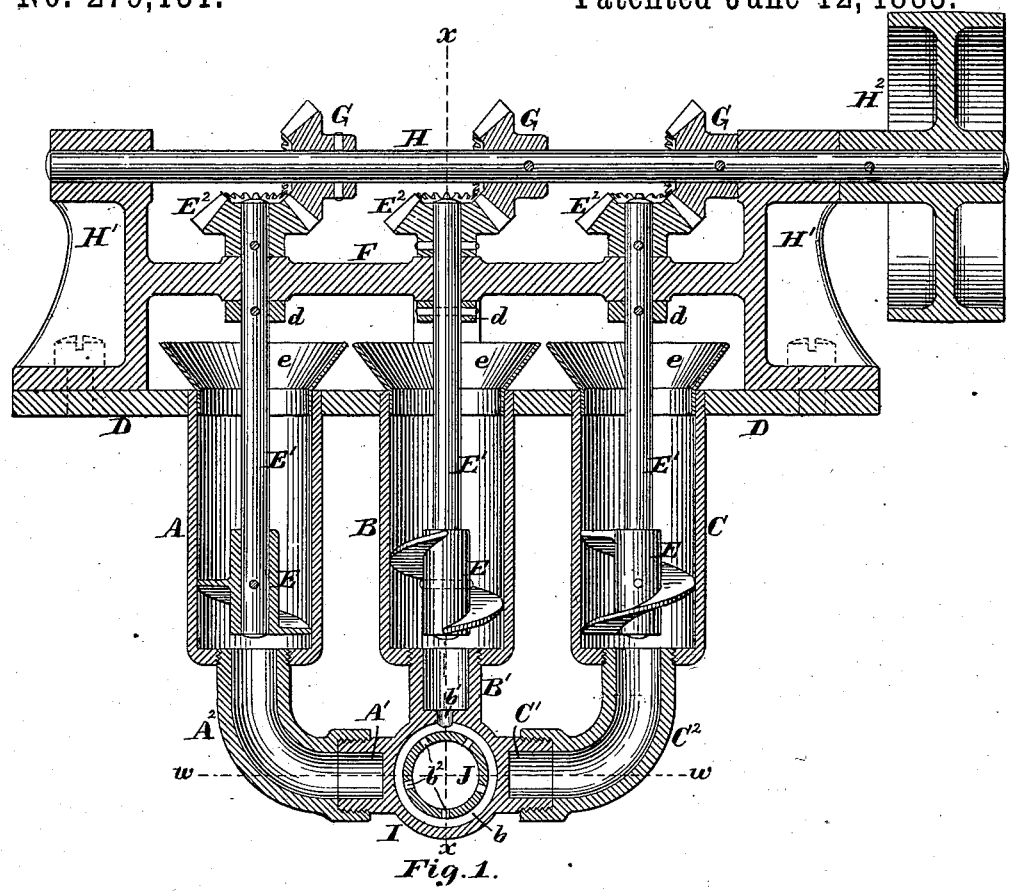
Figure 7:
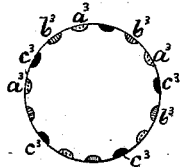
Figure 2:
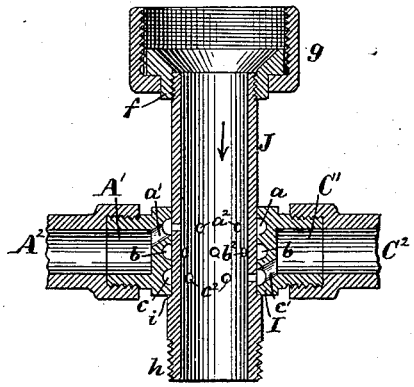
Figure 8:
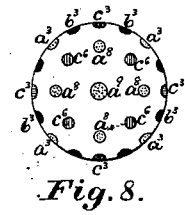

In the drawings, Figure 1 is a central vertical section of an apparatus embodying my invention. Fig. 2 is a horizontal section on line $w\,w$ on Fig. 1. Fig. 3 is a vertical section on line $x\,x$ on Fig. 1. Fig. 4 is a partial vertical section enlarged, and illustrating the method of introducing lines or stripes to the interior of a column of plastic material. Fig. 5 is a section of the same on line $y\,y$ on Fig. 4. Fig. 6 is a section on line $z\,z$ on Fig. 4. Figs. 7 and 8 are enlarged end views of two finished sticks of material, illustrating different arrangements of stripes; and Fig. 9 is a partial vertical section corresponding to Fig. 3, and illustrating a method of coating the entire surface of a stick of plastic material.

A, B, and C are three vertical cylinders arranged side by side, with their upper ends firmly secured in the plate D. Each cylinder is provided at its open upper end with a short funnel, $e$, to facilitate the introduction of paste thereto, and contains at or near its lower end a screw, E, for feeding the paste downward, said screws being secured upon the lower ends of the three vertical shafts E' E' E', having bearings in the horizontal bar F, and provided at their upper ends with the bevel-gears $E^2$ $E^2$ $E^2$, as shown. Each of said shafts E' is provided with a collar, $d$, secured thereon beneath the bar F, said collars serving to prevent the shafts E' E' E' from being thrust upward by their respective screws. The bevel-gears $E^2$ $E^2$ engage with corresponding bevel-gears, G G, secured upon the horizontal driving-shaft H, mounted in bearings H' H', secured to the plate D, and provided at one end with the driving-pulley $H^2$, which may be revolved by a suitable belt, $H^3$. (Shown in dotted lines in Fig. 3.)

I is a short horizontal tube or central hub, having three short tubes, A', B', and C', projecting radially therefrom in different directions, as shown, the tube A' being connected by the elbow $A^2$ to the bottom of the cylinder A, the tube B' to the bottom of the cylinder B, and the tube C' by the elbow $C^2$ to the bottom of the cylinder C.

In the interior of the hub I are formed three circumferential grooves, $a$, $b$, and $c$, at about equal distances apart and surrounding the tube J, which passes through the hub I, accurately fitting the same, and is adapted to have a column of sugar-paste or other plastic material forced through it in the direction indicated by the arrow, Figs. 2 and 3. The groove $a$ communicates by the opening $a'$ with the tube A', Fig. 2, the groove $b$ communicates by the opening $b'$, Figs. 1 and 3, with the tube B', and the groove $c$ by means of the opening $c'$, Fig. 2, with the tube C'. Three series of holes, $a^2$, $b^2$, and $c^2$, are drilled through the sides of the tube J, and communicate, respectively, with the three grooves $a$, $b$, and $c$.

The cylinders A, B, and C being filled with paste of the proper consistency, and each cylinder containing a different color, if the driving mechanism be set in motion to revolve the screws E E E in the proper direction the paste contained in the cylinder A will be gradually fed downward through the elbow $A^2$, tube A', and opening $a'$ into the groove $a$, and thence through the holes $a^2$ and deposited in lines or stripes upon the exterior of a column of paste which is being fed through the tube J. In the same manner the paste in the cylinder B will be fed down through the tube B' and opening $b'$ into the groove $b$ and through the holes $b^2$ to form longitudinal stripes of another color, and the paste from the cylinder C will be fed through the elbow $C^2$, tube C', opening $c'$, groove $c$, and holes $c^2$ to form stripes of still another color, and thus the column of paste which passes through the tube J will issue therefrom having upon its exterior surface a series of longitudinal stripes of different colors arranged at such distances apart and in such order as may be determined by the position of the holes $a^2$, $b^2$, and $c^2$ in said tube J.

The number, width, or circumferential order of the stripes may be varied by changing, respectively, the number, size, or position of the holes $a^2$, $b^2$, and $c^2$, and the colors may be varied as desired. In the apparatus shown in the drawings three cylinders are employed; but one, two, or more may be employed, as may be desired. The machine as shown in Figs. 1, 2, and 3 is adapted for producing fifteen stripes of three different colors, five stripes of each color, the arrangement of said stripes being indicated in Fig. 7, which represents an enlarged end view of a stick of confectionery, the stripes being equal distances apart and the colors arranged in regular succession around the circumference. The paste from the cylinder A, passing through the groove $a$ and holes $a^2$, produces the stripes $a^3$, the paste from the cylinder B, passing through the groove $b$ and holes $b^2$, produces the stripes $b^3$, and the paste from the cylinder C, passing through the groove $c$ and holes $c^2$, produces the stripes $c^3$.

Figs. 4, 5, and 6 illustrate at an enlarged scale the method of introducing lines or stripes of one or more colors to the interior of a column of sugar-paste or other plastic material. A small tube, $a^4$, extends diametrically across the tube J and communicates at each end with the groove $a$. The tube $a^4$ is provided with a hole or opening, $a^5$, in the center of its length, and concentric with the axis of the tube J, and with two other holes, $a^6$ $a^6$, between the hole $a^5$ and the ends of the tube $a^4$. Two other tubes, $a^7$ $a^7$, extend inward toward the center of the tube J at right angles to the tube $a^5$. They are each provided at their inner ends with an opening, $a^6$, upon one side thereof, and communicate at their outer ends with the groove $a$. The groove $c$ also communicates with the outer ends of four tubes, $c^4$, projecting inward toward the center of the tube J, and each having an opening, $c^5$, upon one side at its inner end. The paste fed to the groove $a$ passes into the tubes $a^4$ and $a^7$, and is delivered at the openings $a^5$ and $a^6$ into the interior of the tube J, and the paste from the groove $c$ passes into the tubes $c^4$, and is delivered at the openings $c^5$, and the column of paste which is being forced through the tube J, around the various small tubes above mentioned, will surround and envelop the lines of paste issuing from said openings, and be delivered from the tube J with a series of longitudinal stripes or lines of one or more colors extending through the interior thereof. Stripes of different colors may at the same time be placed upon the exterior of the stick of paste by means of the openings $a^2$, communicating with the groove $a$, the openings $b^2$, communicating with the groove $b$, and the openings $c^2$, communicating with the groove $c$, in the manner as previously described. The design produced by this special arrangement of holes and tubes is illustrated in Fig. 8, and the operation is as follows: The paste which is fed from the cylinder A to the groove $a$ will pass through the tubes $a^4$ and $a^7$ and openings $a^5$ and $a^6$, and form the four interior stripes $a^8$, Fig. 8, and the central interior stripe, $a^9$, while the paste which enters holes $a^2$ will form the four external stripes $a^3$. The paste fed from the cylinder B to the groove $b$ will enter the openings $b^2$ to form the eight exterior stripes $b^3$; and the paste fed from the cylinder C to the groove $c$ will pass through the tubes $c^4$ and openings $c^5$, and form the four interior stripes $c^6$, and the paste which passes through the holes $c^2$ will form the four exterior stripes $c^3$.

I have described the particular design which the machine as shown in the drawings is adjusted to produce; but it is obvious that the number and position of the tubes for producing the internal stripes may be varied, the number, shapes, and sizes of the openings in said tubes may be changed, the colors of the paste may be varied as desired, and an almost unlimited number of combinations and designs produced.

The tube J is adapted to be connected with a suitable machine arranged to force paste through said tube, as is illustrated in Fig. 3. Upon one end of the tube J is secured the flange $f$, surrounded by the swivel coupling-ring $g$, which may be screwed upon the end of the horizontal cylinder or tube K to connect the tube J therewith. A portion of a vertical cylinder, L, is shown, provided with a suitable screw, M, for forcing the paste contained therein downward to the screw N, arranged to force the paste through the horizontal cylinder K, in substantially the same manner as shown and described in either of two other applications of mine of even date herewith. My present invention is applicable to either of the machines shown and described in the applications referred to.

The tube J is provided at its outer end with the screw-thread $h$ for the purpose of attaching thereto a device for twisting the sticks of plastic material, which device may be constructed on the same principle as the one shown and described in Letters Patent No. 194,954, granted to me September 11, 1877. A shoulder, $i$, is formed upon the tube J as a means of fixing the proper position of said tube within the hub I by coming in contact with the end of the hub I when the series of openings in the tube J are opposite the respective grooves in the hub I.

In Fig. 9 is illustrated a method of coating the entire surface of a stick of sugar-paste of one or more colors with paste of another color, instead of covering it partially by striping, as before described. In this case only one of the cylinders A, B, or C would be used—as, for instance, the cylinder B. The tube J is divided at a point within the hub I where the groove $b$ is situated, and the ends are separated, as shown, so that the groove $b$ communicates throughout its entire circumference with the interior of the tube J, and the paste fed into the groove $b$ will surround the column of paste passing through the tube J, and deposit upon the entire surface thereof a coating of even thickness. The openings through the tube J communicating with the grooves $a$ and $c$ may be dispensed with.

What I claim as new, and desire to secure by Letters Patent of the United States, is—

1. In a machine for working, shaping, and combining plastic materials, one or more cylinders or receivers provided with means for forcing the material therefrom, in combination with the tube J, the hub I, provided with one or more grooves or annular spaces surrounding said tube, and communicating therewith and with said cylinder or cylinders, and means of forcing plastic material through the tube J, substantially as and for the purposes described.

2. In a machine for working, shaping, and combining plastic materials, one or more cylinders or receivers provided with means for forcing the material therefrom, in combination with the tube J, the hub I, provided with one or more grooves or annular spaces communicating with said cylinder or cylinders, one or more tubes projecting into the interior of the tube J, communicating at their outer ends with said annular space or spaces, and each having one or more openings upon one side thereof within the tube J, and means of forcing plastic material through said tube J, substantially as and for the purposes described.

3. In a machine for working, shaping, and combining plastic materials, one or more cylinders or receivers provided with means for forcing the material therefrom, in combination with the hub I, provided with one or more grooves or annular spaces, each communicating with one of said cylinders, the tube J, provided with one or more orifices, $a^2$, $b^2$, or $c^2$, one or more tubes projecting into the interior of the tube J, and communicating with said groove or grooves, and also with the interior of the tube J, by one or more openings in each of said tubes, and means for forcing plastic material through said tube J, substantially as and for the purposes described.

In testimony whereof I have signed my name to this specification, in the presence of two subscribing witnesses, on this 16th day of January, A. D. 1883.

OLIVER R. CHASE.

Witnesses:
E. A. HEMMENWAY,
WALTER E. LOMBARD.